(12) United States Patent
Barbas et al.

(10) Patent No.: US 10,747,903 B2
(45) Date of Patent: *Aug. 18, 2020

(54) IDENTIFICATION OF PSEUDONYMIZED DATA WITHIN DATA SOURCES

(71) Applicant: International Business Machines Corporation, Armonk, NY (US)

(72) Inventors: Pedro Barbas, Dunboyne (IE); Austin Clifford, Glenageary (IE); Konrad Emanowicz, Maynooth (IE); Patrick G. O'Sullivan, Mulhuddart (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/394,749

(22) Filed: Apr. 25, 2019

(65) Prior Publication Data

US 2019/0251292 A1     Aug. 15, 2019

Related U.S. Application Data

(63) Continuation of application No. 15/800,405, filed on Nov. 1, 2017, now Pat. No. 10,657,287.

(51) Int. Cl.
*G06F 21/62* (2013.01)
*H04L 9/00* (2006.01)

(52) U.S. Cl.
CPC ........... *G06F 21/6254* (2013.01); *H04L 9/00* (2013.01)

(58) Field of Classification Search
CPC ............................. G06F 21/6254; H04L 9/00
See application file for complete search history.

(56) References Cited

U.S. PATENT DOCUMENTS

| | | | |
|---|---|---|---|
| 9,323,892 B1* | 4/2016 | Paris | G16H 10/40 |
| 2005/0165623 A1* | 7/2005 | Landi | G06F 21/6254 |
| | | | 705/2 |
| 2009/0313170 A1* | 12/2009 | Goldner | G06F 21/6254 |
| | | | 705/50 |

(Continued)

FOREIGN PATENT DOCUMENTS

WO     2014075836 A1     5/2014

OTHER PUBLICATIONS

Office Action for U.S. Appl. No. 15/800,405 dated Jul. 9, 2019, pp. 1-21.

(Continued)

*Primary Examiner* — Jason Chiang
(74) *Attorney, Agent, or Firm* — Robert A. Voigt, Jr.; Winstead PC (57) ABSTRACT

A computer-implemented method, computer program product and system for identifying pseudonymized data within data sources. One or more data repositories within one or more of the data sources are selected. One or more privacy data models are provided, where each of the privacy data models includes pattern(s) and/or parameter(s). One or more of the one or more privacy data models are selected. Data identification information is generated, where the data identification information indicates a presence or absence of pseudonymized data and of non-pseudonymized data within the one or more of the data sources. The data identification information is generated utilizing the pattern(s) and/or the parameter(s) to determine pseudonymized data.

6 Claims, 3 Drawing Sheets

(56) References Cited

U.S. PATENT DOCUMENTS

| | | | | |
|---|---|---|---|---|
| 2010/0285774 A1* | 11/2010 | Ginzboorg | ............. | H04L 9/088 |
| | | | | 455/411 |
| 2011/0225114 A1* | 9/2011 | Gotthardt | ............ | G06F 21/6245 |
| | | | | 706/50 |
| 2012/0304304 A1* | 11/2012 | Avrahami | ............... | G06F 21/10 |
| | | | | 726/27 |
| 2014/0244364 A1 | 8/2014 | Evers et al. | | |
| 2014/0359782 A1* | 12/2014 | Golic | ................. | H04L 63/0407 |
| | | | | 726/26 |
| 2016/0124949 A1* | 5/2016 | Chau | .................... | G06F 19/321 |
| | | | | 707/665 |
| 2016/0147945 A1* | 5/2016 | MacCarthy | ......... | G06F 21/6254 |
| | | | | 705/51 |
| 2016/0307063 A1* | 10/2016 | Bright | .................... | G06K 9/344 |
| 2016/0335397 A1* | 11/2016 | Blum | .................. | G06F 21/6254 |
| 2017/0177798 A1 | 6/2017 | Samuel et al. | | |

OTHER PUBLICATIONS

List of IBM Patents or Patent Applications Treated as Related, Apr. 26, 2019, pp. 1-2.

List of IBM Patents or Patent Applications Treated as Related, Mar. 25, 2020, pp. 1-2.

\* cited by examiner

IDENTIFICATION OF PSEUDONYMIZED DATA WITHIN DATA SOURCES

TECHNICAL FIELD

The present invention relates generally to data privacy, and more particularly to the identification of pseudonymized data within data sources.

BACKGROUND

The European Union's (EU) General Data Protection Regulation (GDPR) is in force from May 25, 2018. It replaces the EU Data Protection Directive 95/46/EC, and will apply to all member states of the EU without having a distinct national implementation. Article 4(1) and (2) of the GDPR provide definitions for 'personal data' and 'processing' respectively. Personal data in the GDPR refers to any information which relates to an identifiable natural person. Processing thereof is any usage of that personal data, from collection to erasure and anything in between. The GDPR includes greater territorial scope than the EU Data Protection Directive 95/46/EC, notably and importantly, international application to those who process personal data of individuals in the EU (Art. 3). The GDPR has more rules for transferring personal data to international organizations or third countries than internally to the EU (Art. 44). One of these rules is based on an adequacy decision, that is a sufficient level of protection as per Art. 45(2), assessing the entity's laws, supervision authorities, and international commitments. If a country lacks adequate privacy law, a legal agreement may give grounds for adequacy, for example, Safe Harbor, the original attempt at facilitating trans-Atlantic data flows between the EU and US.

Pseudonymization is a procedure by which the most identifying fields within a data record are replaced by one or more artificial identifiers, or pseudonyms. There can be a single pseudonym for a collection of replaced fields or a pseudonym for each replaced field. The purpose is to render the data record less identifying and therefore lower user objections to its use. Data in this form is suitable for extensive analytics and processing.

The choice of which data fields are to be pseudonymized is partly subjective, but typically includes all fields that are highly selective, such as Social Security Number (SSN) (in the United States). Less selective fields, such as Birth Date or Zip Code are often also included because they are usually available from other sources and therefore make a record easier to identify. Pseudonymizing these less identifying fields removes most of their analytic value and should therefore be accompanied by the introduction of new derived and less identifying forms, such as Year of Birth or a larger Zip Code region.

Data stored in data repositories, may often be pseudonymized for security purposes, privacy concerns, data loss prevention and compliance. For example, the EU GDPR requires that certain types of data be pseudonymized.

Current solutions for discovering whether or not data stored in business enterprises is pseudonymized are typically product specific. Typically, the specific product used to create the pseudonymization must be known in order to determine the pseudonymized state of any data. For example, some pseudonymized solutions maintain a table or database with entries and or metadata therein that do not specifically indicate whether data is pseudonymized or not. The method of indicating the pseudonymization state of data must be known in order to determine from the table or database whether any particular data is pseudonymized or not.

The ability for an expert, for example, a data protection officer within a business enterprise, to detect whether data is pseudonymized, may have to be very elaborate, complicated, and costly in order to take into consideration all of the possible products and methods providing pseudonymization techniques that may be used on all of the different computer devices within the enterprise. Additionally, maintaining this ability in the face of ever-changing numbers and types of available products providing distinct pseudonymization techniques may be very time consuming and expensive. Also, outside vendors, contractors, or temporary consultants may use their own computer devices for providing pseudonymized solution or techniques that are unknown to the business expert.

SUMMARY

In one embodiment of the present invention, a computer-implemented method for identifying pseudonymized data within data sources comprises selecting one or more data repositories within one or more of the data sources. The method further comprises providing one or more privacy data models, each of the privacy data models comprising one or both of one or more patterns and one or more parameters. The method additionally comprises selecting one or more of the one or more privacy data models. Furthermore, the method comprises generating, by a processor, data identification information, the data identification information indicating a presence or absence of pseudonymized data and of non-pseudonymized data within the one or more of the data sources, the generating utilizing the one or both of one or more patterns and one or more parameters to determine pseudonymized data.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Personal data refers to information relating to an identified or identifiable natural person, such as one who can be identified directly or indirectly, in particular by reference to an identifier such as a name, an identification number, location data, online identifier or to one or more factors specific to the physical, physiological, genetic, mental, economic, cultural or social identity of that person.

Personal data which has undergone the pseudonymization process described above, which could be attributed to a natural person by the use of additional information should be considered to be information on an identifiable natural person. The application of pseudonymization to personal data can reduce the risks to the data subjects concerned and help controllers and processors to meet their data protection obligations. Pseudonymized data may also be referred to as anonymized data, however pseudonymization is not a method of anonymization, it merely reduces the linkability of a dataset with the original identity of a data subject, and is accordingly a useful security measure.

Most corporations and businesses retain large volumes of data, including pseudonymized data, due to lack of general quantified utilization methods for creating and storing the pseudonymized data. Pseudonymized data may apply to any type of data, for example, structured data, semi-structured data, or unstructured data. Pseudonymized data may also refer to data that persists in a type of storage unit, for example, a formal database or a commercial or open-source repository.

The need for organizations to address and utilize pseudonymized data in the present era is no longer centered on the expense of managing large volumes of data, but instead, is centered on a need to ensure that the value and privacy of the corporate data asset is realized to the fullest extent possible. Additionally, organizations may also need to consider how long such data should be stored, and may need to determine business relevance of various data domains when determining how long to retain information. Questions may be asked, such as: "Should data about a former customer be stored and for how long?"; and "What is the relevance of such data to current business operations?".

Embodiments of the present invention allow for the identification and meaningful use and/or reuse of pseudonymized stored data in order to more fully leverage data as a corporate or organizational asset. For example, identifying exactly which data has been pseudonymized allows an organization to harvest security patterns and/or other traits that may valuably contribute to corporate or organizational decision-making or for deriving other business insight. For example, the quality of statistical analysis often relies on the number of data points present in a calculation. Accordingly, the identification of pseudonymized data can introduce additional data points that may not otherwise be identified for inclusion in a statistical analysis, to strengthen the statistical analysis and to still comply with privacy rights. In other examples, the use of pseudonymized data could serve to improve customer security, or in a government agency setting, to better serve the citizen(s).

Embodiments of the present invention may also integrate with existing data security solutions, for example, such as IBM® Guardium's® Data Discovery and Sensitive Data Finder.

Figure 1:
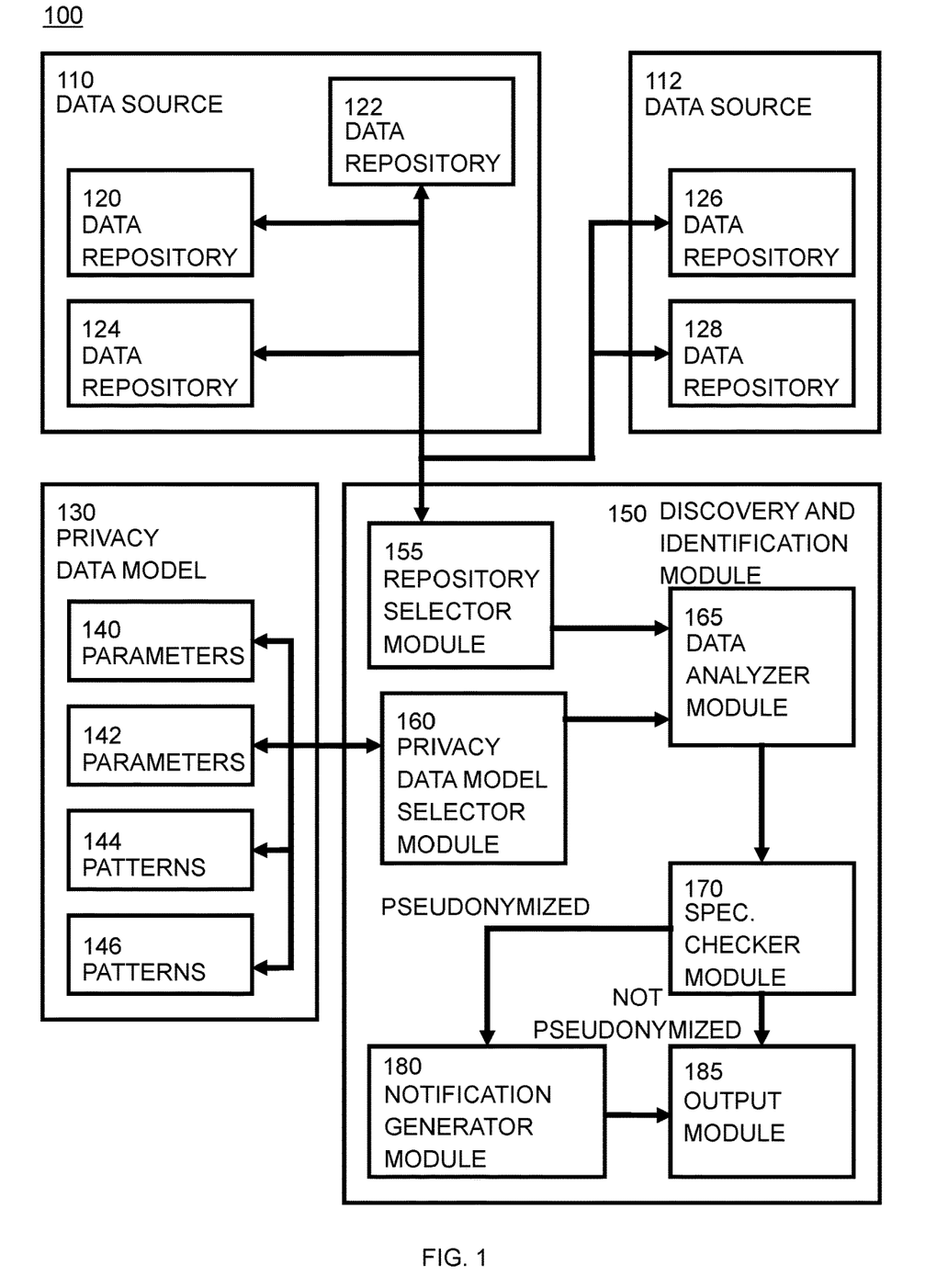
FIG. 1 is a block diagram of apparatus for discovering, in accordance with an embodiment, pseudonymized data within data sources.

FIG. 1 is a block diagram of apparatus 100 within which embodiments of the present invention may be implemented. One or more data sources 110, 112 comprise one or more data repositories 120-128 within each data source 110, 112. Each of the data repositories 120-128 is generally an identifiable or discoverable asset. Each of the data stores 120-128 may contain pseudonymized data. Each data source 110, 112 may comprise any number of data repositories 120-128 and different ones of the data stores 110, 112 may comprise different numbers of data repositories 120-128.

Figure 2:
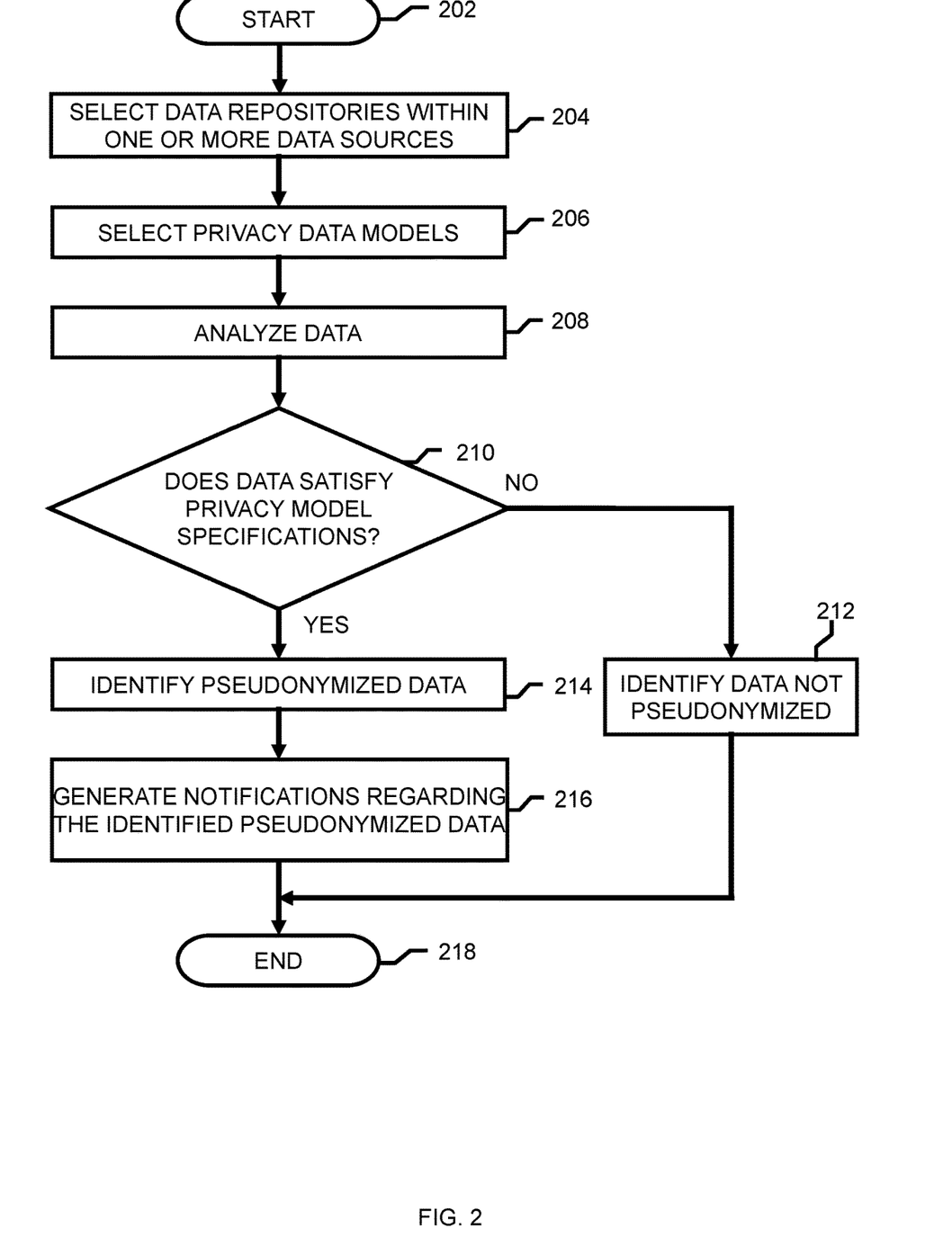
FIG. 2 is a flow chart of an embodiment of a computer-implemented method for discovering pseudonymized data within data sources.

Referring now to FIG. 2, which is a flow diagram of an embodiment of a computer-implemented method for identifying pseudonymized data. The computer-implemented method starts at step 202. At step 204, repository selector module (155 in FIG. 1) in identification module (150 in FIG. 1) selects data repositories 120-128 within data sources 110, 112 for data analytics to identify pseudonymized data within the data sources 110-112. Data repositories 120-128 may be explicitly selected for data analytics or may be implicitly selected, that is by discovery. An example of explicit selection of data repositories 120-128 is when an identifier associated with a particular data repository 120-128 is selected. An example of implicit selection is when the data repository 120-128 is identified through generalization, such as any data repository 120-128 within a given data source 110, 112, within a data center or located on a cluster of machines. In embodiments, the data repositories 120-128 selected may include all data repositories 120-128 that a particular user, group, application or other entity has access to.

Returning to FIG. 1, privacy data model 130 in identification module 150 may comprise one or more parameters 140, 142 or privacy data model 130 may comprise one or more patterns 144, 146 or it may comprise both. Parameters 140, 142 and/or patterns 144, 146 are used to determine whether data is classified as pseudonymized data.

Returning to FIG. 2, at step 206, privacy data model selector module (160 in FIG. 1) in identification module 150 selects one or more privacy data models 130. In embodiments of the invention, multiple and concurrent privacy data models 130 may be defined and applied to identify pseudonymization data.

At step 208, data analyzer module (165 in FIG. 1) in identification module 150 in FIG. 1, based on input from repository selector module (155 in FIG. 1) and privacy data model selector module (160 in FIG. 1), analyzes the data stored in the one or more data repositories 120-128.

In embodiments in which privacy data model 130 comprises one or more patterns 144, 146 anonymization deconstruction techniques may be used. As an example, a hash function, very often chosen as a common technique to create pseudonymized data, represents a one-way method of converting data into a hashed value, often simply called a hash. When a user first provides information, such as, for example, credit card details, this information is hashed and only the hash value is stored. As an example, the credit card number of:

4012888888881881 may be hashed using an SHA2-256 Base64 hash to produce a cryptographic digest of:

3RPN+a+d07r0bOlq7NcWPKvzgcyyHmPxXw+
   hCxxmP6k= which is then stored as a hash.

When a user returns and enters the information again, a hash of the newly entered information is freshly calculated and then compared with the stored hash. If the two hashes match, then the user can be authenticated. The key to the use of hashes is the one way nature of the hash. If a third party, such as a hacker, obtains the hash or a collection of hashes, it is not possible to directly work out what the information was, even if the particular hash function that was used is known, that is, it is not possible to work out that the hash 3RPN+a+d07r0bOlq7NcWPKvzgcyyHmPxXw+
   hCxxmP6k= above corresponds to the information of:

4012888888881881.

By deconstructing cryptographic digests, such as the SHA2-256 example above, pseudonymized data can be identified. In the example above, the cryptographic digest comprises a binary string of fixed length, the particular length depending on which digest is used, SHA2-256 producing a 256 bit digest. Binary encoding of, for example, an SHA2-256 hash, is not commonly used. More commonly used is a Base-64 encoding of the, for example, SHA2-256 hash. A Base64 encoded digest may be recognized from the output pattern result. As an example, an SHA2-256 bit hash produces a 256 bit cryptographic digest, which is equivalent to 32 bytes. Base64 encoding converts that into 44 characters, with each 3 bytes being converted into 4 characters, with padding added. 3 bytes corresponds to 24 bits, which when divided into 4 characters gives 6 bits per character, meaning that 64 (2 to the power of 6) different character representations are used. Padding of value 0 is added.

In the example above, the first 30 bytes of the SHA2-256 hash are converted to 40 characters. The last 2 bytes (3 and ® below) are padded out with a zero value byte to produce 3 bytes. These are then Base64-encoded to produce "P6k=".

the numeric values corresponding to or coding for letters, numbers and other frequently used symbols. A statistical test to determine as to whether the frequency values differ from non pseudonymized data as to whether certain possible values in the data are missing may be able to indicate whether a specific data value represents pseudonymized data.

Semantic change is known to be associated with an increase of frequency of the form whose meaning expands. This increase of frequency is to be expected as the form comes to carry more meanings; it is used in a broader number of contexts, hence more often. This implies that any instance of semantic change should have its empirical counterpart in the frequency rise of the use of the form. This frequency of data within the data repository 120-128 is used to calculate a frequency distribution table that displays the frequency of various outcomes. When the number of occurrences of a particular value or characteristic of the data is lower, then the data is more predictable. Higher values of the number of occurrences of a particular value or characteristic of the data are thus associated with pseudonymized data.

| Text content | 3 | | | | | | | | ® | | | | | | | | <Padding> | | | | | | | |
|---|---|---|---|---|---|---|---|---|---|---|---|---|---|---|---|---|---|---|---|---|---|---|---|---|
| ASCII | 63 (0x3f) | | | | | | | | 169 (0xa9) | | | | | | | | 0 (0x00) | | | | | | | |
| Bit pattern | 0 | 0 | 1 | 1 | 1 | 1 | 1 | 1 | 1 | 0 | 1 | 0 | 1 | 0 | 0 | 1 | 0 | 0 | 0 | 0 | 0 | 0 | 0 | 0 |
| Character index | 15 | | | | | | | | 58 | | | | | | | | 36 | | | | | 0 | | |
| Base64-encoded | P | | | | | | | | 6 | | | | | | | | k | | | | | = | | |

Base64-encoding may be recognized by looking for the following pattern 144-146. The string is of fixed length, the string contains the characters a-z, A-Z, 0-9, + and / and the string ends with between zero and two "=" characters. In the example above of an SHA2-256 cryptographic digest, the string is of fixed length of 44 characters and ends with one "=" character. In an example of an SHA2-512 cryptographic digest, the string is of fixed length of 86 characters and ends with two "=" characters. In an example of an SHA2-224 cryptographic digest, the string is of fixed length of 40 characters and ends with two "=" characters. In an example of an SHA-1 cryptographic digest, the string is of fixed length of 28 characters and ends with one "=" character.

Further examples of applying the cryptographic digest SHA2-256 with a Base64 encoding to the address "Race Tracks • 3500 75th St W, Rosamond, Calif. 93560, United States", produce a hash value of "IU6ztKhBEGDsLb5cCJGycJviytnrPClcUXbfxvmwKT8=". Similarly by applying the cryptographic digest SHA2-256 with a Base64 encoding to the address "Mall of America 60 E Broadway, Bloomington, Minn. 55425 United States", the result will be the hash value "7djVc7RW7MTjlLgBjHNBWHyjC7cm4N8FxV08lqmb4qQ=". Both of the hashed values can be recognized by having 44 character tokens long and by ending with "=".

In embodiments in which privacy data model 130 comprises one or more parameters 140, 142, pseudonymized data may also be identified by the meaning of each individual data value within the data repository 120-128. Cognitive semantics is then used to identify the absolute frequency of specific data values within the data repository 120-128. Usually, the lower frequency of a specific data value can be associated with pseudonymized data. Other calculations derived from the frequency data calculated are possible as well. In an embodiment, frequency data is examined for characteristic frequency structures such as those pseudonymized data may have, for example, such as Other calculations derived from the frequency distribution table are possible as well. One example is to look at the frequency data for characteristic frequency structures such as those common to those which pseudonymized data may have. When the data set values are dominated by relatively few data values, such as the numeric values corresponding to, or coding for, letters, numbers and other frequently used symbols, a probabilistic test as to whether the frequency pattern differs from a standard non-pseudonymized data set as to whether certain possible values in the data are missing may be able to indicate whether the data set is not pseudonymized.

Next the frequency distribution values may be compared to a predefined threshold value. If the frequency distribution value exceeds the predefined threshold, then the data value is pseudonymized. If the frequency distribution value fails to exceed the predefined threshold, the data value is not pseudonymized.

At step 210, the spec checker module (170 in FIG. 1) in identification module 150 checks whether the data satisfies privacy data model 130 specifications. This is done by comparing the cognitive semantics results with a predetermined threshold value. If the absolute frequency value is below (or fails to exceed) the predetermined threshold, the data is not pseudonymized. At step 212, output module (185 in FIG. 1) in identification module 150 provides this information as an output. The computer-implemented method ends at step 218.

If the absolute frequency values are above the predetermined threshold, the associated data is pseudonymized. At step 214, the output module (185 in identification module 150 provides the identified pseudonymized data as an output. Data may be formally identified as pseudonymized data by generating notifications regarding the identified pseudonymized data values. For example, notifications can be based on a subscription for an explicitly or implicitly identified data repository 120-128. At step 216, notification generator module (180 in FIG. 1) in identification module 150 generates notifications regarding the identified pseudonymized data. Output module 185 provides this information as an output. The computer-implemented method ends at step 218.

In other embodiments, user parameters 140, 142 may also be specified, and an evaluation may be performed to determine whether data complies with specific user directives, for example a user should have the right to have personal data concerning him or her rectified and a "right to be forgotten" where the retention of such data infringes the GDPR or EU or Member State law to which the organization/data controller is subject. In particular, a user should have the right to have his or her personal data erased and no longer processed where the personal data are no longer necessary in relation to the purposes for which they are collected or otherwise processed, where a user has withdrawn his or her consent or objects to the processing of personal data concerning him or her, or where the processing of his or her personal data does not otherwise comply with the GDPR. A user must explicitly give consent for processing personal and sensitive data with a clear affirmative action. This consent can be withdrawn, and the organization or data controller must be able to demonstrate that consent was given. Accordingly, embodiments of the present invention permit exclusion of a user context, for example, whether a context of time to live, or consent, for asserting whether or not data may constitute pseudonymized data. As such, metadata analytics may be performed on user parameters, and based on the privacy policies incorporated and implemented by the organization. Such privacy policies may, for example, include or define metadata indices to control the time frame representing the date to remove the user data from the organization data store, or may also include specific authorization consent from the user. For example, the following pseudo-code may represent new user data to the organization data repositories 120-128:

```
{
timestamp: "2017-05-25-13.34.19.342328",
username: "jdoe",
name: 'John Doe",
age: 40,
consent: true,
pseudonymization: true,
time_to_live:: "2017-08-02-13.34.19.551617",
phone: ["914 555 0123", "914 555 0101" ],
country: "US',
city "New York"
address: 'Fifth Avenue"
}
```

User parameters 140, 142 such as expected access time periods, access characteristics, for example, onward transfer principle, such as sharing data with different third parties inside or outside the European Union jurisdiction, relative to a group or individual or the like, may be established by an organization and may vary for different categories of data.

Privacy data models 130 may also specify degrees of linking by behavior pattern, based upon a contextual meaning in regard to an audience or privacy user model, permitting a context to be established for an identified audience in terms of the role played within an organization. The audience may be, for example, an individual/person, a team, a department, an organization, the enterprise itself (boundaries for an enterprise can vary), a computer application, a procedure, a process or the like.

Privacy data models 130 may be established for each audience. For example, data may be considered to be pseudonymized data relative to an individual's use of data. Data may be considered to be pseudonymized data relative to a group's use of data. A group may be, for example, a team, a department, an organization or an enterprise or the like. Data may also be considered to be pseudonymized relative to an application program, procedure, or process. For example, an individual's work may or may not be part of a workflow within a group. If an individual's data-based work products, for example, decisions or actions, are not formally part of a workflow, the group's quantified use of data may still be regarded as pseudonymized even though, the individual, as a member of the group, does not have privacy requirements about his own data. Additionally, if an individual has left the group, any privacy requirements use of data by the individual may be removed from the group's determined use of data.

Figure 3:
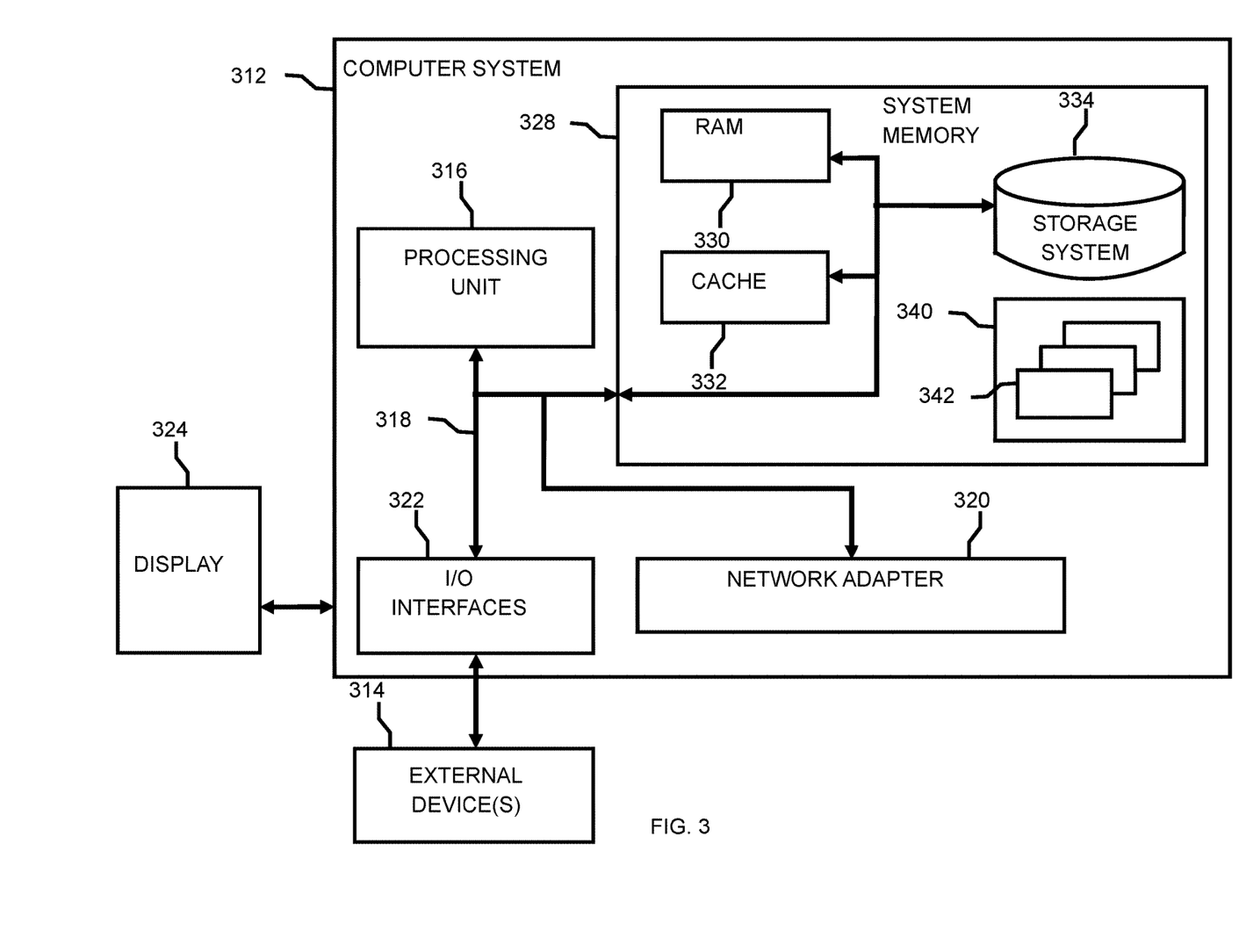
FIG. 3 is a block diagram of a computer system in which embodiments of the present invention may be implemented.

Referring now to FIG. 3, a schematic of an example of computing system is shown. Computing system 312 is only one example of a suitable computing system and is not intended to suggest any limitation as to the scope of use or functionality of embodiments of the invention described herein. Regardless, computing system 312 is capable of being implemented and/or performing any of the functionality set forth hereinabove.

Computer system/server 312 is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

The present invention may be a system, a computer-implemented method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, column-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, computer-implemented methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying pseudonymized data within data sources, the method comprising:
   selecting one or more data repositories within one or more of said data sources;
   providing one or more privacy data models, each of said privacy data models comprising one or both of one or more patterns and one or more parameters;
   selecting one or more of said one or more privacy data models;
   analyzing data stored in said one or more selected data repositories using one or more parameters from said selected one or more privacy data models, wherein said analysis using said one or more parameters from said selected one or more privacy data models comprises identifying a meaning of each individual data value within said one or more selected data repositories, wherein said meaning of each individual data value within said one or more selected data repositories is determined by using cognitive semantics to identify an absolute frequency of specific data values within said one or more selected data repositories;
   calculating a frequency distribution table containing frequency distribution values based on said identified absolute frequency of specific data values within said one or more selected data repositories;
   comparing said frequency distribution values of said frequency distribution table to a predefined threshold value to determine a presence or absence of pseudonymized data; and
   determining a data value within a data source to be pseudonymized in response to its associated frequency distribution value exceeding said predefined threshold value.

2. The computer-implemented method as recited claim 1 further comprising:
   generating notifications for said pseudonymized data within said one or more of said data sources.

3. The computer-implemented method as recited in claim 1, wherein said one or more patterns correspond to an encoded cryptographic digest.

4. The computer-implemented method as recited in claim 1, wherein said one or more parameters correspond to absolute frequency information associated with specific data values.

5. The computer-implemented method as recited in claim 1, wherein said one or more parameters comprise a user parameter.

6. The computer-implemented method as recited claim 1 further comprising:
   analyzing data stored in said one or more selected data repositories using one or more patterns from said selected one or more privacy data models, wherein said analysis using said one or more patterns from said selected one or more privacy data models comprises using anonymization deconstruction techniques; and
   identifying pseudonymized data by deconstructing cryptographic digests.

* * * * *